United States Patent [19]
Dean

[11] 3,973,741
[45] Aug. 10, 1976

[54] FISHING LINE CHANGER
[75] Inventor: Melvin Dean, Los Angeles, Calif.
[73] Assignee: The Raymond Lee Organization, Inc., a part interest
[22] Filed: Apr. 4, 1975
[21] Appl. No.: 564,993

[52] U.S. Cl. .......................... 242/84.1 R; 242/106
[51] Int. Cl.² ..................................... A01K 89/00
[58] Field of Search ............. 242/84.1 R, 84.4, 99, 242/106, 104

[56] References Cited
UNITED STATES PATENTS

| | | | |
|---|---|---|---|
| 533,868 | 2/1895 | Daly | 242/106 |
| 2,848,778 | 8/1958 | Plummer | 242/84.1 R X |
| 3,026,059 | 3/1962 | Dennler | 242/106 X |
| 3,506,213 | 4/1970 | Young | 242/84.1 R |
| 3,685,761 | 8/1972 | Zelinski | 242/84.1 R |

Primary Examiner—Edward J. McCarthy

[57] ABSTRACT

A cylindrically shaped spool is attached positively to an axially extending axle so that the axle and spool rotate as a unit. Means characterized by a V-shaped member and a bolt located above the member detachably secure the axle to a fishing rod by pressing the rod into the member. The means leaves the axle free to rotate, and places the axis of the spool perpendicular to the rod. A crank is detachably securable to the axle.

2 Claims, 3 Drawing Figures

FISHING LINE CHANGER

SUMMARY OF THE INVENTION

The object of the invention is to provide a device that can be detachably secured to a fishing rod to transfer fishing line to a reel located on the rod or to transfer line from the reel onto the spool.

Thus, a spool is detachably secured to a fishing rod by suitable means in a manner at which the spool is perpendicular to the rod and is free to rotate. To insure freedom of rotation, the spool is positively attached to an axle so that the spool and axle rotate as a unit. The axle is mounted so that it can rotate in the means. A crank may be attached to the axle, when if the spool is to be used to wind up line from the fishing reel. Otherwise, the crank adds inertia to the spool, and the crank is therefore detachably securable to the axle, for removal when the spool is used to supply line to be wound up on the reel.

DETAILED DESCRIPTION OF PREFERRED EMBODIMENTS

Figure 1:
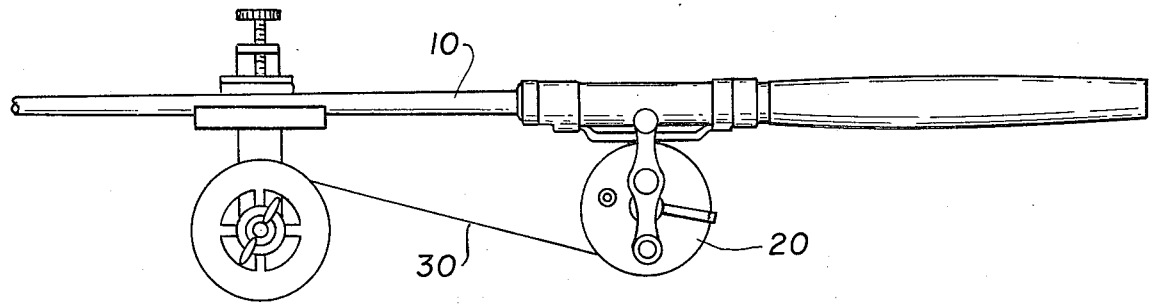
FIG. 1 shows the invention in use.
Figure 2:
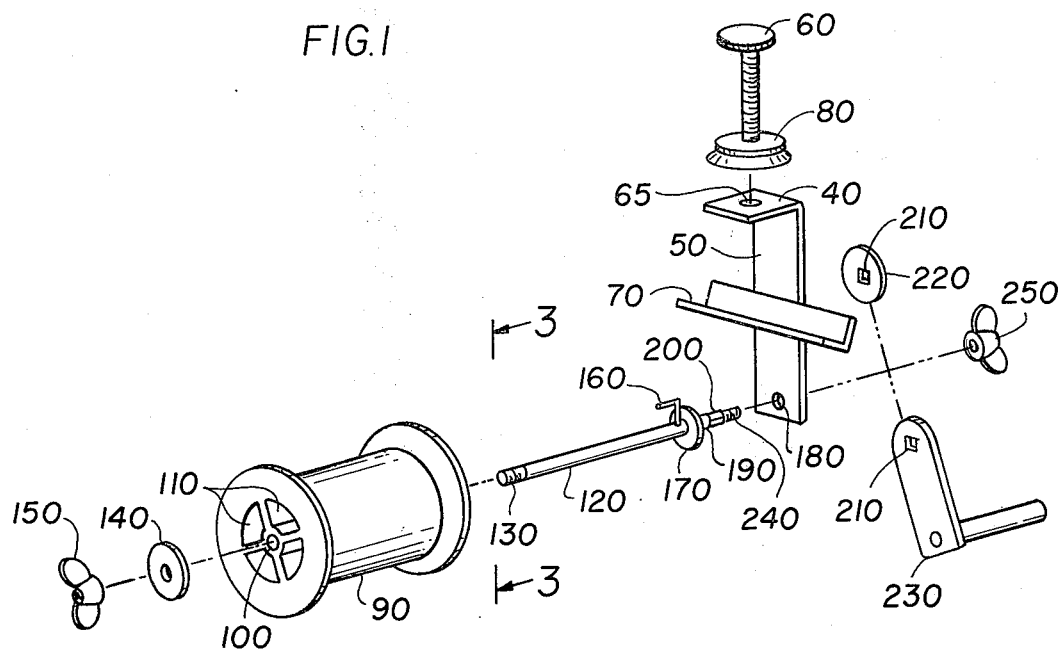
FIG. 2 is an exploded perspective drawing of the invention.
Figure 3:
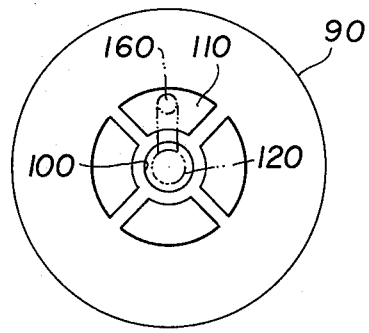
FIG. 3 is a view taken along line 3—3 in FIG. 2.

A conventional fishing rod 10 supports a conventional fishing reel 20 loaded with line 30. An L-shaped member with a short horizontal top flange 40 and a longer vertical flange 50 supports a bolt 60 in a tapped hole 65 in the flange 40. An elongated V-shaped horizontal member 70 is attached to the flange 50. The member 70 can be padded so that the rod 10 will not be damaged when it is disposed in member 70 and then locked therein by bolt 60. A nut 80 is threaded on the bolt above the flange 40 to prevent the bolt from rotating when the nut is tightened down on flange 40.

A cylindrical spool 90 has an axial bore 100 surrounded by four like wedge shaped holes 110 that extend through the spool around the bore. The bore extends horizontally at right angles to member 70. The spool is mounted on an elongated cylindrical axle 120 that extends through the bore. The front end 130 of the axle is threaded and passes through the spool and a washer 140 before it is threaded into wingnut 150. A right-angled prong 160 is attached to the axle and extends parallel to it, and is located in one of the holes 110 when the spool is mounted on the axle. Thus, the spool positively engages the axle, and the two rotate together as a unit. Behind the prong is a disc-shaped spacer 170 secured to the axle.

The rear of the axle passes through circular hole 180 in the lower end of flange 50, until spacer 170 abuts the flange. The portion of the axle that actually passes through the hole 180 is round in cross-section, but directly rearwardly of this round section 190 is section 200, which in cross-section has the shape of a square. Section 200 can either engage the square hole 210 in a circular disc 220 or a crank 230 on the other side of flange 50. The rearmost end 240 of the axle is threaded to engage wingnut 250 and thereby detachably secure disc 220 or the crank to the axle, between wingnut 250 and flange 50. As can be seen in FIG. 1, the spool is supported below the rod and at right angles to it, in front of the reel. When line is to be reeled onto the spool, the crank is attached to the axle. When line is to be reeled off the spool, the crank is removed and the disc substituted on the axle.

Although the invention has been described with particular reference to the drawings, the protection sought is to be limited only by the terms of the claims which follow.

What is claimed is:

1. A fishing line changer for use with a fishing rod having a reel thereon, the axis of the reel being disposed at right angles to the rod, said changer comprising:
   a cylindrically shaped spool having a bore and an off center opening in one end;
   an axle extending through said bore with at least one exposed end, said end having a circular cross section, said axle having a region adjacent said end which has a square cross section;
   a right angled prong secured to said axle intermediate said region and said one end of the spool, said prong being parallel to the axle and engaging said off center opening whereby said axle and spool rotate as a unit;
   means supporting the axle in a manner at which the axle is free to rotate, the means detachably securing the spool to said rod in a manner at which the axis of the spool is parallel to the axis of the reel;
   a crank detachably securable to said region for enabling line to be transferred from the reel to the spool; and
   a disc detachably securable to said region for enabling line to be transferred from the spool to the reel.

2. The changer of claim 1 wherein the means is characterized by a V-shaped member and a bolt located above the member to press the rod into the member and wherein a line is wound on the spool, said reel and spool cooperating to enable the line to be unwound from the spool onto the reel and vice versa.

* * * * *